(12) United States Patent
Otaka

(10) Patent No.: US 11,579,822 B2
(45) Date of Patent: Feb. 14, 2023

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventor: Satoshi Otaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 17/346,078

(22) Filed: Jun. 11, 2021

(65) Prior Publication Data

US 2021/0392483 A1 Dec. 16, 2021

(30) Foreign Application Priority Data

Jun. 15, 2020 (JP) .............................. JP2020-103340

(51) Int. Cl.
*G06F 3/12* (2006.01)

(52) U.S. Cl.
CPC .......... *G06F 3/1225* (2013.01); *G06F 3/1209* (2013.01); *G06F 3/1226* (2013.01); *G06F 3/1292* (2013.01)

(58) Field of Classification Search
CPC .... G06F 3/1209; G06F 3/1225; G06F 3/1226; G06F 3/1292
See application file for complete search history.

(56) References Cited

U.S. PATENT DOCUMENTS

2017/0351467 A1* 12/2017 Wakabayashi ............ G06F 9/48

FOREIGN PATENT DOCUMENTS

JP 2017219961 A 12/2017

* cited by examiner

*Primary Examiner* — Moustapha Diaby
(74) *Attorney, Agent, or Firm* — Canon U.S.A., Inc. IP Division

(57) ABSTRACT

A control method of an information processing apparatus including a predetermined application program that cannot acquire predetermined information regarding a communication apparatus using a predetermined method, includes acquiring, in a case where the predetermined information is stored by a different application program that is different from the predetermined application program and can acquire the predetermined information using the predetermined method, the predetermined information stored by the different application program, using the predetermined application program, executing, in a case where the predetermined information stored by the different application program is acquired, processing that is based on the predetermined information stored by the different application program, using the predetermined application program, and displaying a predetermined region for prompting a user to install the different application program, using the predetermined application program.

20 Claims, 8 Drawing Sheets

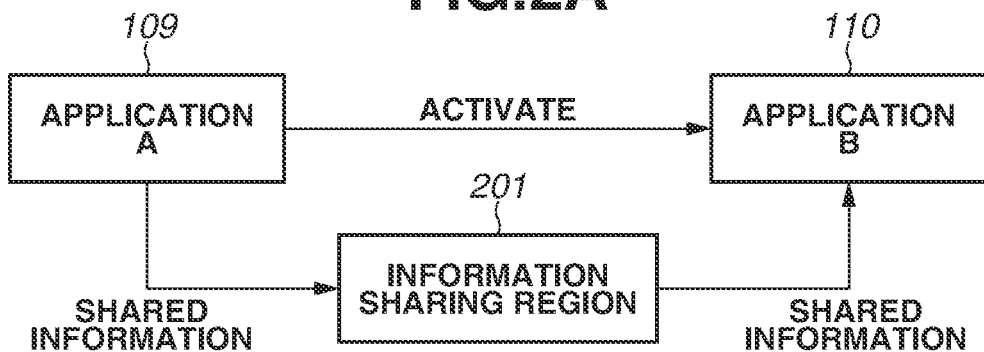
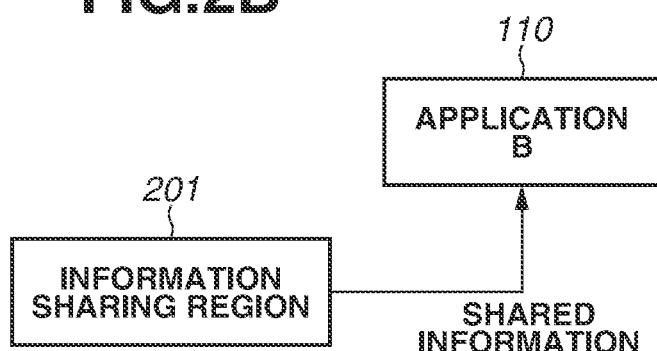
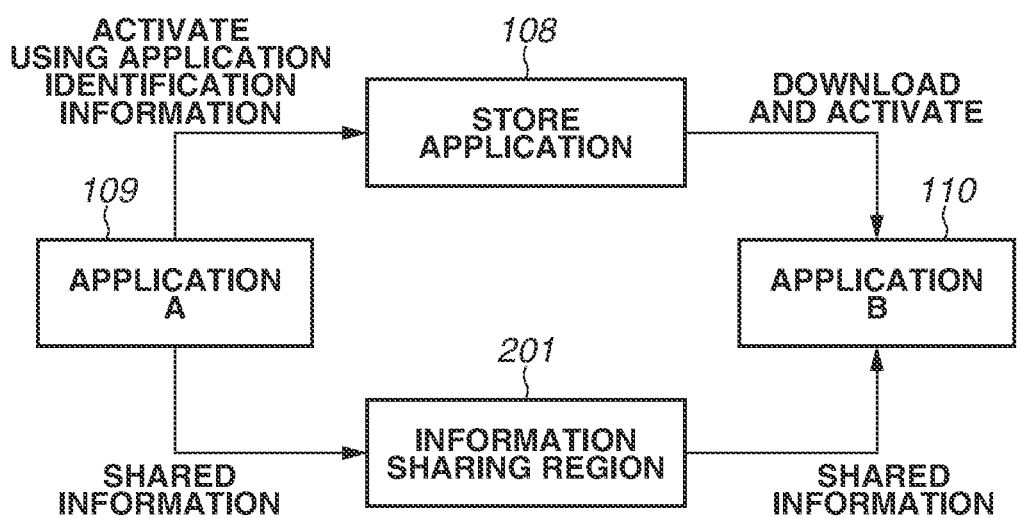

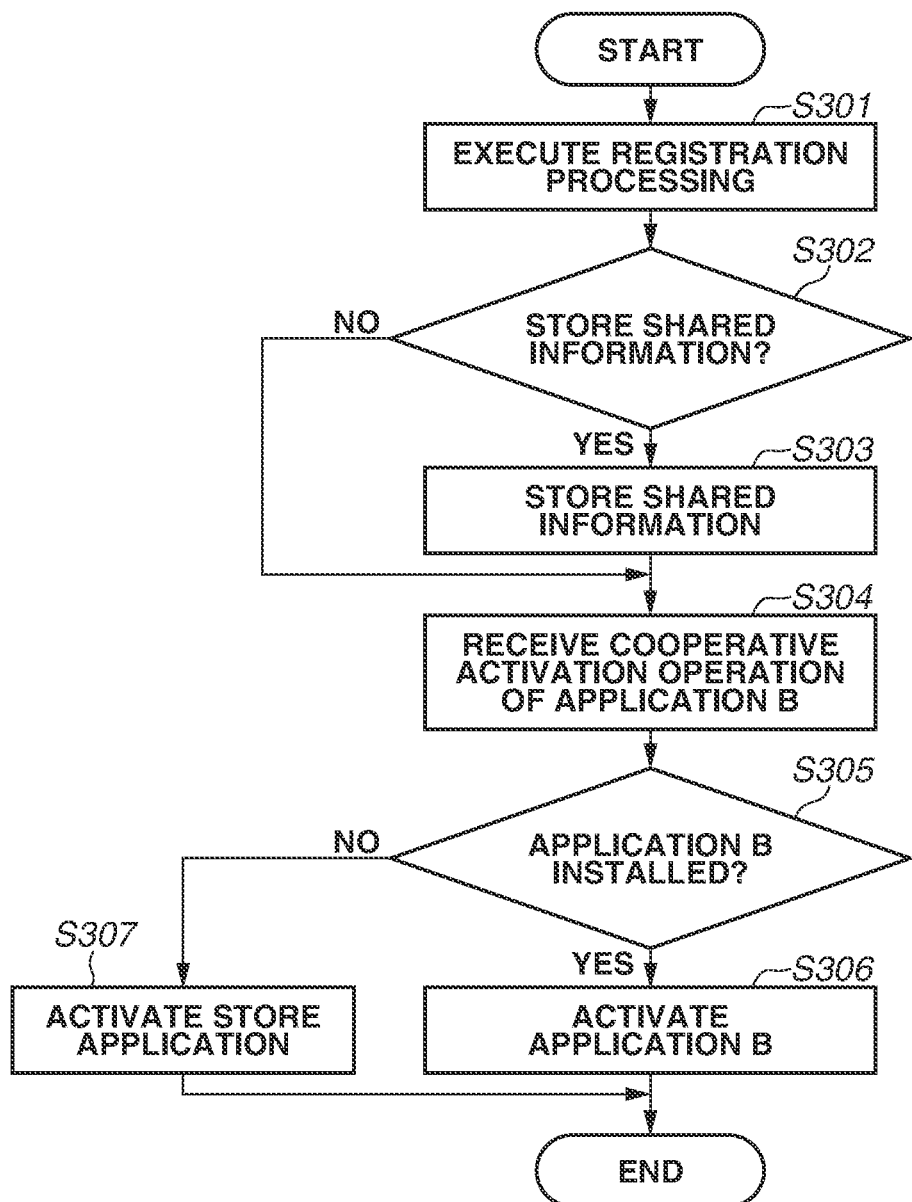

FIG.8

CONNECT SMARTPHONE AND PRINTER

1. PREPARE FOR CONNECTION OF SMARTPHONE AND PRINTER
   REFER TO "SETUP GUIDE" FOR MORE DETAILS.
   IF PREPARATION IS COMPLETED, GO TO PROCEDURE 2.

2. DOWNLOAD APPLICATION A
   CLICK HERE TO OPEN DOWNLOAD PAGE.
   IF DOWNLOAD IS COMPLETED, GO TO PROCEDURE 3 WITHOUT ACTIVATING APPLICATION A.

3. CHANGE Wi-Fi CONNECTION DESTINATION OF SMARTPHONE TO SSID STARTING WITH "Canon_IJ_".

4. ACTIVATE APPLICATION A
   EXECUTE SETUP IN ACCORDANCE WITH INSTRUCTION.
   IF SETUP IS COMPLETED, GO TO PROCEDURE 5.

5. END APPLICATION A
   CONFIRM THAT SMARTPHONE AND PRINTER ARE CONNECTED.

6. REACTIVATE APPLICATION (APPLICATION B) DESIRED TO BE USED

INFORMATION PROCESSING APPARATUS, CONTROL METHOD OF THE SAME, AND STORAGE MEDIUM

BACKGROUND

Field of the Disclosure

The present invention relates to an information processing apparatus, a control method of the same, and a storage medium.

Description of the Related Art

An information processing apparatus such as a mobile terminal or a smartphone has been known. In the above-described information processing apparatus, there has been generally used a technique called program cooperation by which programs such as applications installed on the information processing apparatus operate cooperatively with each other. Specifically, the program cooperation is, for example, a technique of making processing that is based on information acquired by a predetermined program, executable in a program different from the predetermined program.

Japanese Patent Application Laid-Open No. 2017-219961 discusses a technique of sharing information between a first application and a second application by the first application storing, in an information sharing region, information desired to be shared between the first application and the second application, and the second application acquiring the shared information from the information sharing region.

On the other hand, as the program cooperation becomes common, it is demanded to enhance convenience of programs that can execute the program cooperation.

SUMMARY

The present disclosure is directed to enhancing the convenience of programs that can execute the program cooperation.

According to an aspect of the present disclosure, a control method of an information processing apparatus including a predetermined application program that cannot acquire predetermined information regarding a communication apparatus using a predetermined method, includes acquiring, in a case where the predetermined information is stored by a different application program that is different from the predetermined application program and can acquire the predetermined information using the predetermined method, the predetermined information stored by the different application program, using the predetermined application program, executing, in a case where the predetermined information stored by the different application program is acquired, processing that is based on the predetermined information stored by the different application program, using the predetermined application program, and displaying a predetermined region for prompting a user to install the different application program, using the predetermined application program.

According to another aspect of the present disclosure, a control method of an information processing apparatus including a predetermined application program that cannot acquire predetermined information regarding a communication apparatus using a predetermined method, includes acquiring, in a case where the predetermined information is stored by a different application program that is different from the predetermined application program and can acquire the predetermined information using the predetermined method, the predetermined information stored by the different application program, using the predetermined application program, executing, in a case where the predetermined information stored by the different application program is acquired, processing that is based on the predetermined information stored by the different application program, using the predetermined application program, and displaying a predetermined region for prompting a user to activate the predetermined application program, using the predetermined application program after the communication apparatus is registered using the different application program, wherein the processing that is based on the predetermined information stored by the different application program is processing of registering, in the predetermined application program, the communication apparatus corresponding to the predetermined information as an apparatus that performs communication using the predetermined application program, and wherein, in a case where the communication apparatus corresponding to the predetermined information is registered in the different application program as an apparatus that performs communication using the different application program, the predetermined information is stored.

Further features of the present disclosure will become apparent from the following description of exemplary embodiments with reference to the attached drawings.

BRIEF DESCRIPTION OF THE DRAWINGS

FIGS. 2A, 2B, and 2C are diagrams each illustrating a use case of cooperatively activating an application B.

FIG. 3 is a flowchart illustrating processing executed by the mobile terminal using an application A.

FIG. 8 illustrates an example of a screen including an instruction manual.

DESCRIPTION OF THE EMBODIMENTS

Hereinafter, an information processing apparatus according to an exemplary embodiment of the present disclosure will be described in detail with reference to the drawings. The following exemplary embodiments are not intended to limit the present disclosure set forth in the appended claims, and not all of the combinations of features described in the present exemplary embodiment are always essential to the solution of the present disclosure.

An information processing apparatus to which the present disclosure is applied will be described. In a first exemplary embodiment, a mobile terminal is used as an example of an information processing apparatus, but the information processing apparatus is not limited to this. For example, various apparatuses on which programs can be installed, such as a laptop personal computer (PC), a tablet terminal, a personal digital assistant (PDA), a digital camera, a music reproduction device, and a television, can be applied as the information processing apparatus. In the present exemplary embodiment, a smartphone is used as an example of the mobile terminal. The smartphone refers to a multifunctional mobile phone equipped with a camera function, an internet browser function, and an e-mail function in addition to a mobile phone function.

Figure 1A:
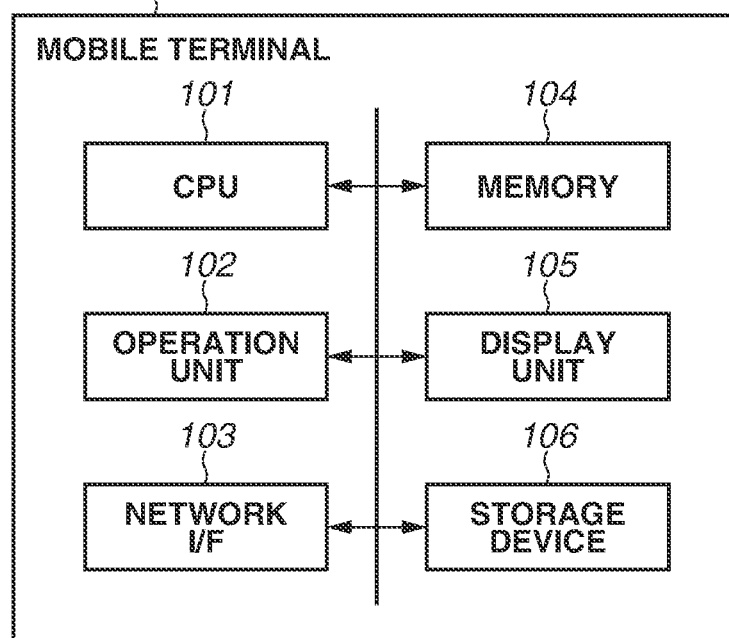
FIGS. 1A and 1B are diagrams each illustrating a configuration of a mobile terminal.
Figure 1B:
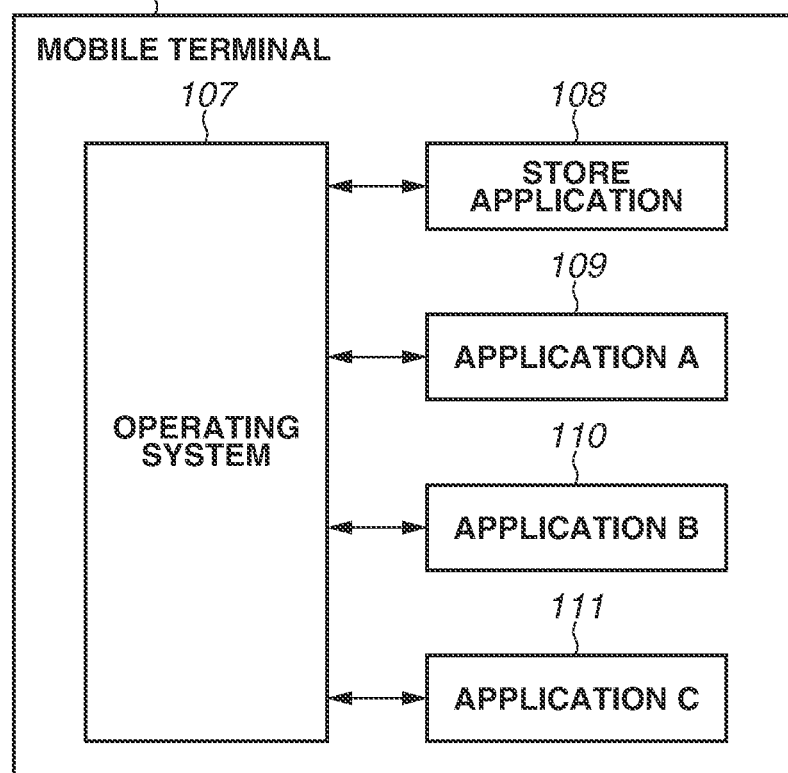

FIGS. 1A and 1B are block diagrams each illustrating a configuration of a mobile terminal 100 that is an information processing apparatus according to the present exemplary embodiment. FIG. 1A illustrates a hardware configuration of the mobile terminal 100, and FIG. 1B illustrates a software configuration of the mobile terminal 100.

The mobile terminal 100 includes a central processing unit (CPU) 101, an operation unit 102, a network interface (I/F) 103, a memory 104, a display unit 105, and a storage device 106, which are connected with each other via a system bus.

The CPU 101 controls the entire mobile terminal 100. The operation unit 102 is an operation unit for a user to issue an instruction to the mobile terminal 100, and includes a button or a touch panel, for example.

The memory 104 is a random access memory (RAM) serving as a working area of the CPU 101. The memory 104 is used as a temporary storage region for various types of received data, and stores various types of setting data.

The storage device 106 is a flash memory, for example, and stores various control programs such as an application and an operating system (hereinafter, referred to as an OS).

The network I/F 103 is an interface for connecting the mobile terminal 100 to a network. The mobile terminal 100 is configured to be connectable to the network via the network I/F 103 and be connectable to the internet or an external device such as a printer via the network. In the present exemplary embodiment, the network I/F 103 can execute communication complying with the IEE802.11 series (communication by Wi-Fi®). The communication is not limited to the communication by Wi-Fi®, and communication that uses another method such as Bluetooth® may be executed by the network I/F 103. In addition, the mobile terminal 100 may include a plurality of network interfaces. For example, the mobile terminal 100 may include a network interface that can execute communication by Bluetooth® Low Energy (BLE) aside from the network I/F 103. In addition, for example, the mobile terminal 100 may include a network interface that can execute communication by Near Field Communication (NFC).

The display unit 105 is a unit that displays various types of information, and includes a liquid crystal panel. The operation unit 102 is a unit for receiving an operation from the user. In the present exemplary embodiment, the operation unit 102 and the display unit 105 constitute a single component, and are configured to perform, by the single component, both the reception of an operation performed by the user and the display of various types of information. In other words, the operation unit 102 and the display unit 105 are formed as a touch display. By moving a finger on the touch display or tapping the touch display, the user can issue various instructions to the mobile terminal 100 and operate the mobile terminal 100. In addition, the user can also issue various instructions to the mobile terminal 100 by operating the touch display using an operative tool other than a finger, such as a pen for a capacitive touch panel including a stylus pen. In addition, the operation unit 102 and the display unit 105 may not be the single component. For example, the operation unit 102 may be a physical keyboard including a physical key.

As illustrated in FIG. 1B, in the present exemplary embodiment, the mobile terminal 100 can use an OS 107, a store application program 108, and three or more application programs. As the three or more application programs, the mobile terminal 100 can use an application program A 109, an application program B 110, and an application program C 111. Hereinafter, an application program will be referred to as an application. In the following description, processing executed by an application is actually implemented by the CPU 101 loading the application into the memory 104 and executing the application.

Figure 5:
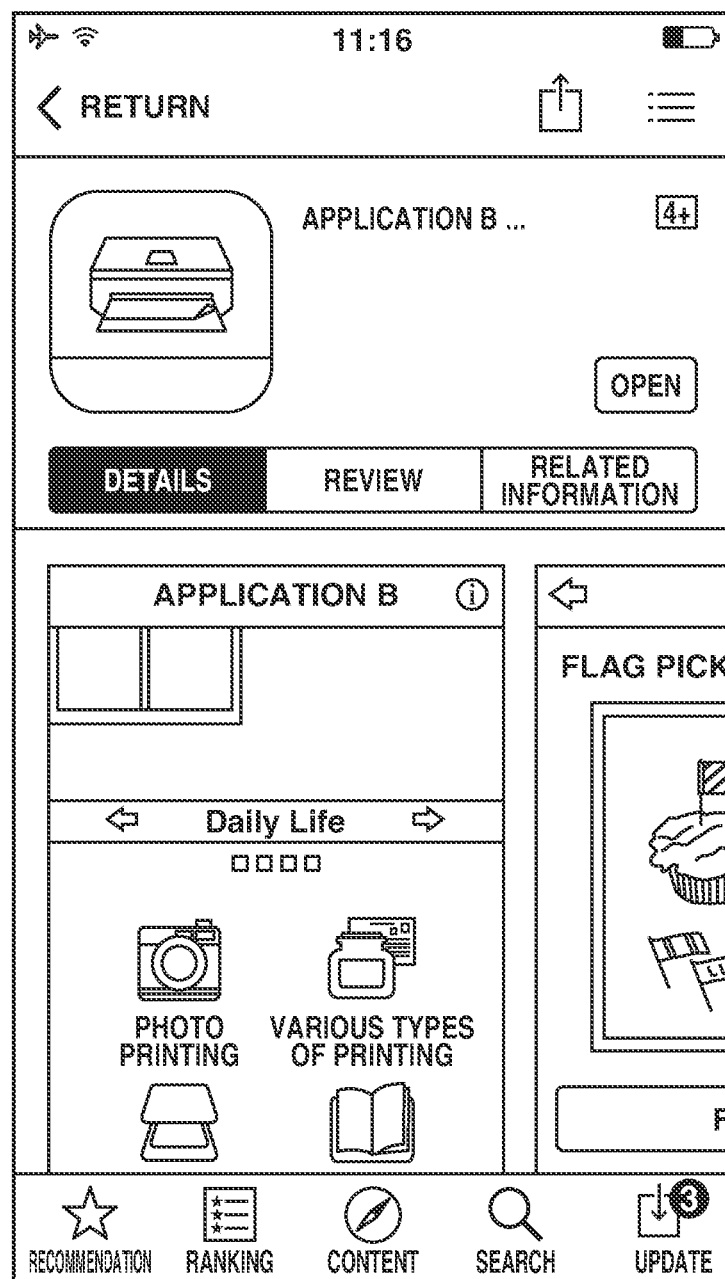
FIG. 5 illustrates an example of a screen to be displayed by a store application.

The store application 108 is an application for downloading and installing another application such as the application A 109, the application B 110, or the application C 111, onto the mobile terminal 100. The user selects a desired application using the store application 108, and performs a predetermined operation for downloading the selected application (e.g. tapping on a download button, performing password authentication). The user can thereby download and install the selected application onto the mobile terminal 100. In addition, by performing a predetermined operation (e.g. tapping on an open button) on a screen displayed by the store application 108, the user can also activate an application that has already been installed on the mobile terminal 100 via the store application 108. FIG. 5 is a diagram illustrating an example of a screen to be displayed by the store application 108. FIG. 5 illustrates a screen for activating the application B 110 in a state in which the application B 110 has already been installed on the mobile terminal 100. As described above, by the open button being tapped, the application B 110 is activated. Similarly to the application B 110, the application C 111 can also be downloaded, installed, and activated from the store application 108.

The application A 109, the application B 110, and the application C 111 are applications downloaded by the store application 108 onto the mobile terminal 100 via a network. The application A 109, the application B 110, and the application C 111 may be downloaded from a storage medium storing the applications, for example, instead of being downloaded via the store application 108. Alternatively, the application A 109, the application B 110, and the application C 111 may be downloaded via a web browser, for example. The downloaded application is installed onto the mobile terminal 100 and becomes usable in the mobile terminal 100. In addition, the application A 109 may be prestored in the mobile terminal 100 at the time of arrival. In the present exemplary embodiment, the application A 109, the application B 110, and the application C 111 are applications for transmitting a print job to a printer having a print function, and causing the printer to execute printing that is based on the transmitted print job. The application A 109, the application B 110, and the application C 111 may have another function in addition to the function of causing the printer to execute printing. For example, the application A 109, the application B 110, and the application C 111 may have a function of transmitting a scan job to a printer, and causing the printer to execute scanning that is based on the transmitted scan job.

The store application 108, the application A 109, the application B 110, and the application C 111 operate via the OS 107. These software components are stored in the storage device 106, loaded into the memory 104, and executed by the CPU 101.

In the present exemplary embodiment, the application A 109 and the application B 110, and the application A 109 and the application C 111 cooperatively operate. Specifically, the application B 110 operates using information used by the application A 109. In addition, the application C 111 operates using information used by the application A 109.

Hereinafter, the cooperative operation of programs will be referred to as program cooperation. In particular, the cooperative operation of applications will be referred to as application cooperation. Specifically, the application cooperation is a technique of making processing that is based on information (shared information to be describe below) used in the application A 109, executable in another program (e.g., the application B 110) that can be activated from the application A 109, for example.

In the present exemplary embodiment, activation methods of applications include independent activation and cooperative activation. The independent activation refers to a certain application being activated in response to an application icon being tapped on a home screen displayed by an OS, or being activated in response to an operation performed on a screen displayed by the store application 108, for example. In the present exemplary embodiment, all of the store application 108, the application A 109, the application B 110, and the application C 111 can be independently activated. The cooperative activation refers to a certain application being activated in response to an operation performed on a screen displayed by another application that shares information (shared information to be described below) to be used by the certain application. In the present exemplary embodiment, at least the application B 110 and the application C 111 can be cooperatively activated in response to an operation performed on a screen displayed by the application A 109. If the application B 110 or the application C 111 is cooperatively activated, the activated application B 110 or application C 111 is notified of information from an application (the application A 109) that triggers the cooperative activation. Thus, the CPU 101 can identify which of the cooperative activation and the independent activation is used as an activation method of the application B 110 or the application C 111.

Figure 6:
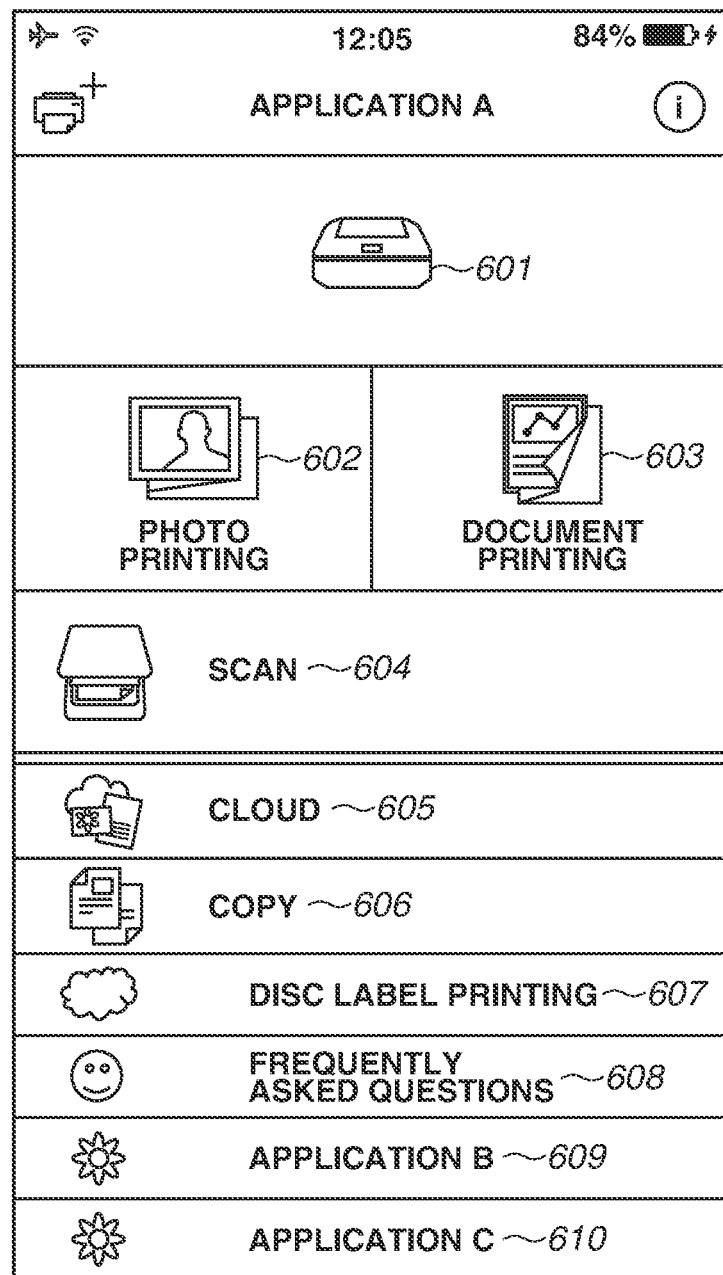
FIG. 6 illustrates an example of a screen to be displayed by the application A.

FIG. 6 illustrates an example of a screen to be displayed by the application A 109. An icon 601 indicates a printer registered in the application A 109. The registration of a printer will be described below. In a state in which no printer is registered in the application A 109, the icon 601 is not displayed. In this state, a region including a message or an icon for prompting the registration of a printer may be displayed in place of the icon 601. Icons 602 and 603 are buttons for transmitting a print job to the printer registered in the application A 109 and causing the printer to print a photo or a document stored in the mobile terminal 100. An icon 604 is a button for transmitting a scan job to the printer registered in the application A 109 and causing the printer to execute scanning. An icon 605 is a button for executing a cloud print function of causing the printer to print image data stored in an external server. An icon 606 is a button for transmitting a copy job to the printer registered in the application A 109 and causing the printer to create a copy of a document. An icon 607 is a button for transmitting a print job to the printer and causing the printer to execute printing onto a disc medium. For example, to execute the printing onto a disc medium, another application (application for disc medium printing) different from the application A 109 is required in some cases. In such cases, if the CPU 101 receives an operation on the icon 607 in a state in which the application for disc medium printing is installed on the mobile terminal 100, the CPU 101 cooperatively activates the application for disc medium printing. An icon 608 is a button for opening a web page explaining how to operate the application A 109. An icon 609 is a button for cooperatively activating the application B 110. If the CPU 101 receives an operation on the icon 609 in a state in which the application B 110 is installed on the mobile terminal 100, the CPU 101 cooperatively activates the application B 110. If a printer not supporting the application B 110 is registered in the application A 109, for example, the CPU 101 may avoid receiving an operation on the icon 609 by bringing the icon 609 into a grayout state or hiding the icon 609. An icon 610 is a button for cooperatively activating the application C 111. If the CPU 101 receives an operation on the icon 610 in a state in which the application C 111 is installed on the mobile terminal 100, the CPU 101 cooperatively activates the application C 111. If a printer not supporting the application C 111 is registered in the application A 109, for example, the CPU 101 may avoid receiving an operation on the icon 610 by bringing the icon 610 into a grayout state or hiding the icon 610.

The application A 109 is an application for causing a printer to execute printing that is based on image data selected by the user, among image data obtained by image capturing performed by the mobile terminal 100 and image data downloaded by the mobile terminal 100. On the other hand, the application B 110 is an application for causing a printer to execute printing that is based on image data prestored in the application B 110, for example. In addition, the application B 110 is an application for causing a printer to execute printing that is based on image data acquired by the application B 110 via a network from an external server supporting the application B 110, for example. In addition, the application B 110 may be an application for disc medium printing or an application for causing a printer to execute printing of New Year's greeting cards, for example. Similarly to the examples of the application B 110, the application C 111 may be an application having various functions.

A use case of cooperatively activating the application B 110 via the application A 109 in a state in which the application A 109 and the application B 110 are already installed on the mobile terminal 100 will be described with reference to FIG. 2A. First, if the CPU 101 identifies that a printer is registered (registration information about a printer is generated) by printer registration processing, the CPU 101 stores the generated registration information in an information sharing region 201 as shared information 202. At this time, the shared information 202 is information usable by the CPU 101 in an operation of the application A 109. In addition, the information sharing region 201 is a storage region in which the shared information 202 is stored. The information sharing region 201 may be a shared folder accessible in both an operating state of the application A 109 and an operating state of the application B 110, for example, or may be a clipboard or a pasteboard managed by an OS. In addition, the shared folder may be a region included in a memory in the mobile terminal 100, such as the storage device 106, a region included in an external storage medium such as a secure digital (SD) card or a hard disc drive (HDD), or a region on a network server. The configuration of the shared folder is not limited as long as the shared folder is configured to store information usable in both an operating state of the application A 109 and an operating state of the application B 110.

Subsequently, if the CPU 101 identifies that the application B 110 is to be cooperatively activated as a result of receiving an operation on the icon 609, the CPU 101 cooperatively activates the application B 110. Then, after the CPU 101 cooperatively activates the application B 110, the CPU 101 acquires the shared information 202 by the application B 110 by referring to the information sharing region 201. Then, the CPU 101 determines whether the acquired shared information 202 is information usable by the application B 110 (whether the shared information 202 is information applicable to the application B 110). Hereinafter, the determination will be referred to as availability determination. If the CPU 101 determines that the shared information 202 is information usable by the application B 110, the CPU 101 executes processing that is based on the shared information 202. If the CPU 101 determines that the shared information 202 is not the information usable by the application B 110, the CPU 101 does not execute the processing that is based on the shared information 202.

The availability determination is executed using information included in the acquired shared information 202. A case is cited where, for example, a model name of a printer is included in the shared information 202. In this case, as the availability determination, the CPU 101 determines whether a model name list of printers supporting the application B 110 includes the model name included in the shared information 202. If the model name list includes the model name included in the shared information 202, the CPU 101 determines that the acquired shared information 202 is information usable by the application B 110. If the model name list does not include the model name included in the shared information 202, the CPU 101 determines that the acquired shared information 202 is not the information usable by the application B 110. The model name list needs not be always held by the application B 110 and may be included in a region on a network server or an external storage medium such as an SD card or an HDD.

Alternatively, a case is cited where, for example, a name list of applications adapted to the shared information 202 is included in the shared information 202. In this case, as the availability determination, the CPU 101 determines whether the application B 110 is included in the name list of applications adapted to the shared information 202. If the application B 110 is included in the name list of applications, the CPU 101 determines that the acquired shared information 202 is the information usable by the application B 110. If the application B 110 is not included in the name list of applications, the CPU 101 determines that the acquired shared information 202 is not the information usable by the application B 110.

Next, a behavior of the CPU 101 that is performed when the application B 110 is independently activated not via the application A 109 in a state in which the application A 109 and the application B 110 are already installed on the mobile terminal 100 will be described with reference to FIG. 2B.

Similarly to FIG. 2A, if the CPU 101 identifies that registration information about a printer is generated by printer registration processing, for example, the CPU 101 stores the generated registration information in the information sharing region 201 as the shared information 202. Then, in the present exemplary embodiment, even when the application B 110 is independently activated, the CPU 101 refers to the information sharing region 201. Then, if the shared information 202 is stored in the information sharing region 201, the CPU 101 acquires the shared information 202. Then, the CPU 101 executes the availability determination. If the CPU 101 determines that the shared information 202 is information usable by the application B 110, the CPU 101 executes the processing that is based on the shared information 202. If the CPU 101 determines that the shared information 202 is not the information usable by the application B 110, the CPU 101 does not execute the processing that is based on the shared information 202.

In this manner, in the present exemplary embodiment, the application A 109 stores the shared information 202 in the information sharing region 201 at a timing at which a printer is registered (registration information about a printer is generated). Then, the application B 110 acquires the shared information 202 whichever activation of the cooperative activation and the independent activation is performed, and when the shared information 202 is acquired, the CPU 101 determines whether the acquired shared information 202 is usable. With such a configuration, the CPU 101 can appropriately execute application cooperation between the application A 109 and the application B 110 irrespective of whether the application B 110 is independently activated or cooperatively activated.

Next, a behavior of the CPU 101 that is performed when an operation for cooperatively activating the application B 110 is performed on a screen displayed by the application A 109 in a state in which the application B 110 is not installed on the mobile terminal 100 will be described with reference to FIG. 2C.

Similarly to FIG. 2A, if the CPU 101 identifies that registration information about a printer is generated by printer registration processing, for example, the CPU 101 stores the generated registration information in the information sharing region 201 as the shared information 202.

Even when the operation for cooperatively activating the application B 110 is performed on the screen displayed by the application A 109, if the application B 110 is not installed on the mobile terminal 100, the CPU 101 cannot activate the application B 110 as a matter of course. To install the application B 110 on the mobile terminal 100, it is generally necessary to use the store application 108. Thus, if the operation for cooperatively activating the application B 110 is performed on the screen displayed by the application A 109 in a state in which the application B 110 is not installed on the mobile terminal 100, the CPU 101 executes the following processing.

First, the CPU 101 activates the store application 108. By activating the store application 108 using information (hereinafter, application identification information 203) that can identify a download target application (hereinafter, target application), the CPU 101 can display a screen for downloading the target application on the display unit 105. Thus, at this time, the CPU 101 activates the store application 108 using the application identification information 203 that identifies the application B 110 as a target application. A screen for downloading the application B 110 is thereby displayed on the display unit 105. The CPU 101 accordingly receives an operation from the user, and downloads and installs the application B 110. At this time, the CPU 101 may automatically download the application B 110 without receiving an operation from the user. Then, the CPU 101 receives an operation on an application icon that corresponds to the application B 110 on the home screen, or an operation on the screen displayed by the store application 108 (operation on the open button in FIG. 5). Then, the CPU 101 activates the application B 110 in response to these operations and executes processing similar to the processing illustrated in FIG. 2B. In other words, the CPU 101 executes processing executed when the application B 110 is independently activated.

In this manner, if the operation for cooperatively activating the application B 110 is performed on the screen displayed by the application A 109 in a state in which the application B 110 is not installed on the mobile terminal 100, the CPU 101 downloads the application B 110 using the store application 108. In the present exemplary embodiment, as illustrated in FIG. 2B, the CPU 101 refers to the information sharing region 201 also in the case of independent activation, and determines whether the shared information 202 is usable by the application B 110. Thus, even if the application B 110 is independently activated by being downloaded via the store application 108, printer registration information in the application A 109 can be appropriately shared with the application B 110 as the shared information 202.

The above description has been given of an example in which the CPU 101 always refers to the information sharing region 201 irrespective of whether the application B 110 is cooperatively activated or independently activated, but the present disclosure is not limited to this configuration. For example, in the present exemplary embodiment, the application A 109 and the application B 110 can individually register a printer. Thus, the user may intentionally register different printers in the application A 109 and the application B 110 in some cases. If cooperation between the application A 109 and the application B 110 is established in this case, and a printer registered in the application A 109 is registered in the application B 110, the printer unintended by the user can be registered in the application B 110 to overwrite an existing printer. In addition, the same printer may be already registered in the application A 109 and the application B 110 in some cases. In such cases, if the printer registered in the application A 109 is registered again in the application B 110, the application B 110 executes the processing that is based on the shared information 202 each time the application B 110 is activated, and a processing load applied at the time of activation may be increased.

Thus, when the application B 110 is activated, the CPU 101 determines whether a printer is already registered in the application B 110, and if the printer is already registered in the application B 110, the CPU 101 does not execute the application cooperation. In other words, the CPU 101 does not change the printer already registered in the application B 110.

Even when the printer is already registered in the application B 110, if currently-stored shared information 202 is updated or changed from shared information 202 previously used for the application cooperation, the application cooperation may be executed again. For example, a case is cited where shared information 202 includes information regarding an updated date and time of the shared information 202. In addition, the application B 110 stores information regarding the updated date and time that has been obtained when the shared information 202 has been previously used for the application cooperation. By comparing information regarding the updated date and time that is included in the newly-acquired shared information 202 and information regarding the updated date and time that has been obtained when the shared information 202 has been previously used for the application cooperation, the application B 110 determines whether to execute the application cooperation using the newly-acquired shared information 202. At this time, the information to be compared with the information regarding the updated date and time that is included in the newly-acquired shared information 202 may be another piece of information. For example, the information regarding the updated date and time may be compared with information regarding a latest registered date and time of a printer in the application B 110.

In addition, if the printer already registered in the application B 110 is different from the printer to be registered based on the shared information 202, a dialog for prompting the user to select whether to execute the application cooperation may be displayed. Specifically, for example, if no printer is registered in the application B 110, after it is determined by the availability determination that the shared information 202 is information usable by the application B 110, the CPU 101 registers a printer registered in the application A 109 in the application B 110. As described above, processing of registering a printer registered in the application A 109 in the application B 110 can be rephrased as the application cooperation. The application cooperation is executed in this case because, if no printer is registered in the application B 110, such a problem that a printer registered in the application B 110 is changed to a printer unintended by the user does not occur. On the other hand, if a printer is already registered in the application B 110, after it is determined by the availability determination that the shared information 202 is information usable by the application B 110, the CPU 101 displays a dialog for prompting the user to select whether to execute the application cooperation. The dialog can be rephrased as a dialog for prompting the user to select whether to use the shared information 202, or whether to register a printer registered in the application A 109 in the application B 110. If an input indicating that the application cooperation is to be executed is selected by the user, the CPU 101 executes the application cooperation. If an input indicating that the application cooperation is not to be executed is selected by the user, the CPU 101 does not execute the application cooperation. In other words, the printer already registered in the application B 110 is not changed. This can prevent the printer registered in the application B 110 from being changed to a printer unintended by the user. After the dialog is displayed and the input indicating that the application cooperation is to be executed is selected by the user, the availability determination may be executed.

Even if the shared information 202 is acquired by the application B 110, the shared information 202 is not deleted from the information sharing region 201. In other words, even after the shared information 202 is acquired by the application B 110, the shared information 202 can be used in the application cooperation with an application (e.g., the application C 111) different from the application B 110. With such a configuration, even if the application C 111 is activated without the shared information 202 being updated in the application A 109 after the application B 110 acquires the shared information 202 and executes the application cooperation, the application C 111 can also execute the application cooperation. With such a configuration, convenience improves in a configuration in which a plurality of applications can execute the application cooperation. The shared information 202 is deleted when the application A 109 is deleted (uninstalled) from the mobile terminal 100, for example.

As described above, in the present exemplary embodiment, the application A 109, the application B 110, and the application C 111 have a print function of causing a printer with which the mobile terminal 100 can communicate to print an image. The application A 109, the application B 110, and the application C 111 can execute the print function by registering an apparatus caused to execute printing. The processing (registration processing) of registering an apparatus in an application can be rephrased as processing (setting processing) of setting and registering a registration target apparatus as an apparatus with which communication is to be performed using the application. In this configuration, information (hereinafter, referred to as registration information) regarding a printer registered in the application A 109, for example, can be applied as the shared information 202. Specifically, the registration information refers to model information such as a media access control (MAC) address, a Bonjour name, an internet protocol (IP) address, and a model name of a printer, capability information such as a usable setting value, and information regarding a registered date and time, for example. The registered date and time is a date and time on which the registration information is acquired, for example. If a printer is registered in the application A 109, the icon 601 is displayed on a screen displayed by the application A 109, and the type of printer registered in the application A 109 is presented to the user. Thus, the icon 601 may include information indicating a name or a model number of the printer registered in the application A 109, a state of ink stored in the printer registered in the application A 109, and an error state of the printer registered in the application A 109.

Then, in response to a printer being registered in the application A 109, for example, the CPU 101 stores the registration information about the printer in the information sharing region 201 as the shared information 202. The CPU 101 can thereby execute, using the application B 110, processing of registering the printer that is registered in the application A 109 in the application B 110 as the processing that is based on the shared information 202 and executed at the time of activation of the application B 110. With such a configuration, the CPU 101 can register the printer in the application B 110 without executing printer search processing using the application B 110, for example. If all pieces of information necessary for registering a printer do not fall within the information sharing region 201, at least part of the information necessary for registering the printer may be applied as the shared information 202. Even with such a configuration, an effect of reducing a time taken for the printer search processing, for example, can be obtained. The above-described registration of a printer using the shared information 202 can also be executed in the application C 111.

A plurality of methods may be prepared as registration methods of printers. The registration method can be rephrased as an acquisition method of the registration information about a printer. A first registration method executable by the application A 109 will be described. In the first registration method, the application A 109 searches for a printer supporting the application A 109 on a Wi-Fi network to which the mobile terminal 100 belongs. The Wi-Fi network to which the mobile terminal 100 belongs is a network constructed by a wireless local area network (LAN) router (external access point) to which the mobile terminal 100 connects via Wi-Fi, for example. Then, the application A 109 acquires, via the Wi-Fi network, registration information from a printer selected by the user from among printers discovered by the search processing. The application A 109 thereby registers the printer selected by the user in the application A 109. Specifically, the printers discovered by the search are printers connecting by Wi-Fi to the wireless LAN router to which the mobile terminal 100 connects by Wi-Fi, for example. At this time, if the application A 109 discovers only one printer in the search, the application A 109 may automatically register the printer without making an inquiry to the user. In addition, if the application A 109 discovers a plurality of printers in the search, the application A 109 may register the plurality of printers that has been discovered. Then, in the present exemplary embodiment, based on a fact that a printer has been registered in this manner, the application A 109 stores the registration information about the printer in the information sharing region 201 as the shared information 202.

In some cases, the Wi-Fi network to which the mobile terminal 100 belongs is a network formed between a printer and the mobile terminal 100 by the Wi-Fi Direct standard. In other words, the mobile terminal 100 establishes wireless connection (peer-to-peer (P2P) connection) with the printer in compliance with the Wi-Fi Direct standard, not via the wireless LAN router. Also in this case, a search for a printer is performed on the Wi-Fi network to which the mobile terminal 100 belongs, but only one printer is discovered as a matter of course. By acquiring the registration information from the printer discovered by the search via the network in compliance with the Wi-Fi Direct standard, the application A 109 registers the printer in the application A 109. However, in the present exemplary embodiment, the application A 109 does not store the registration information about the printer in the information sharing region 201 as the shared information 202 based on the registration of the printer with which the mobile terminal 100 connects in compliance with the Wi-Fi Direct standard. This is because some applications cannot execute communication in compliance with the Wi-Fi Direct standard. For example, in the present exemplary embodiment, the application B 110 cannot execute the communication c in compliance with the Wi-Fi Direct standard.

A second registration method executable by the application A 109 will be described. The application A 109 searches for a printer that exists near the mobile terminal 100 and has enabled a predetermined access point, by Wi-Fi. The printer enables the predetermined access point when a predetermined operation for performing a Wi-Fi setup is received from the user, or when an initial setup is performed after unpacking. Then, the application A 109 establishes wireless connection (P2P connection) between the mobile terminal 100 and a printer selected by the user from among printers discovered by the search by Wi-Fi, not via the wireless LAN router. At this time, if the application A 109 discovers only one printer by the search, the application A 109 may automatically establish the P2P connection with the printer without making an inquiry to the user. Then, the application A 109 performs the Wi-Fi setup of the printer wirelessly connecting with the mobile terminal 100 by Wi-Fi.

As the Wi-Fi setup, by transmitting connection information for connecting with a wireless LAN router, for example, to the printer by the P2P connection, the application A 109 connects the printer and the wireless LAN router by Wi-Fi. Subsequently, if the mobile terminal 100 also belongs to a Wi-Fi network constructed by the wireless LAN router, it becomes possible for the mobile terminal 100 to perform Wi-Fi communication with the printer via the wireless LAN router. Thus, by connecting the printer and the wireless LAN router by Wi-Fi and then acquiring registration information from the printer via the wireless LAN router, the application A 109 registers the printer in the application A 109. At this time, Wi-Fi connection between the wireless LAN router and the mobile terminal 100 is maintained without being disconnected by the application A 109. The application A 109 can thereby transmit a print job to the printer via the wireless LAN router. Then, in the present exemplary embodiment, based on the printer being registered in this manner, the application A 109 stores the registration information about the printer in the information sharing region 201 as the shared information 202.

In addition, as the Wi-Fi setup, the application A 109 receives, from the printer, connection information for connecting with a different access point (an internal access point of the printer) that is different from the predetermined access point and is to be enabled in the printer, for example. After transmitting the connection information to the application A 109, the printer enables the different access point. Then, using the received connection information, the application A 109 establishes wireless connection (P2P connection) between the mobile terminal 100 and the printer that has enabled the different access point, by Wi-Fi not via a wireless LAN router. Then, by acquiring registration information from the printer by the P2P connection, the application A 109 registers the printer in the application A 109. The P2P connection is maintained without being disconnected by the application A 109. Thus, the application A 109 can transmit a print job to the printer by the P2P connection. Then, in the present exemplary embodiment, based on the printer being registered in this manner, the application A 109 stores the registration information about the printer in the information sharing region 201 as the shared information 202.

The above description has been given of the configuration of executing the Wi-Fi setup by connecting the mobile terminal 100 and a printer by Wi-Fi, but the connection method is not limited to the connection method in this configuration. For example, a configuration of executing the Wi-Fi setup by connecting the mobile terminal 100 and a printer by BLE may be employed. In this case, for example, the application A 109 exists near the mobile terminal 100 and searches for a printer that has enabled a BLE communication function, by Wi-Fi. Specifically, the printer that has enabled the BLE communication function is a printer operating as an advertiser in the BLE standard, for example. Then, the application A 109 establishes wireless connection by BLE (BLE connection) between the mobile terminal 100 and a printer selected by the user from among printers discovered by the search. At this time, if the application A 109 discovers only one printer by the search, the application A 109 may automatically connect with the printer by BLE without making an inquiry to the user. Then, the application A 109 performs Wi-Fi setup of the printer wirelessly connecting with the mobile terminal 100 by BLE. The application A 109 may have both a function of executing the Wi-Fi setup by Wi-Fi connection and a function of executing the Wi-Fi setup by BLE connection.

A third registration method executable by the application A 109 will be described. The application A 109 searches for a printer that exists near the mobile terminal 100 and operates as an advertiser in the BLE standard by BLE. Then, the application A 109 wirelessly connects, by BLE, the mobile terminal 100 and a printer selected by the user from among printers discovered by the search. Then, the application A 109 acquires, from the printer connecting with the mobile terminal 100 by BLE, connection information for establishing P2P connection with the printer by Wi-Fi. Specifically, the connection information includes a service set identifier (SSID) of an access point to be enabled in the printer, and a password for connecting with the access point. Subsequently, using the acquired connection information, the application A 109 establishes wireless connection (P2P connection) between the mobile terminal 100 and the printer that has enabled the access point by Wi-Fi not via a wireless LAN router. Then, by acquiring registration information from the printer wirelessly connecting with the mobile terminal 100 by P2P connection, the application A 109 registers the printer in the application A 109. If the application A 109 discovers only one printer by the search, the application A 109 may automatically connect with the printer by BLE without making an inquiry to the user, and automatically register the printer. If the registration ends, the application A 109 disconnects the P2P connection between the printer and the mobile terminal 100. Subsequently, when a printing instruction is issued by the user, the application A 109 re-establishes the P2P connection between the printer and the mobile terminal 100 using the connection information again, and transmits a print job. The third registration method may be executed based on a fact that no printer has been discovered in the printer search in the first registration method, for example. In the present exemplary embodiment, the application A 109 does not store registration information about a printer in the information sharing region 201 as the shared information 202 based on a fact that the printer has been registered using the third registration method. This is because the printer cannot be easily used by an application other than the application A 109 since the P2P connection between the printer and the mobile terminal 100 is disconnected after the printer is registered using the third registration method.

A fourth registration method executable by the application A 109 will be described. The application A 109 searches for a printer that exists near the mobile terminal 100 and operates as a P2P device or a group owner in the Wi-Fi Direct standard. The P2P device in the Wi-Fi Direct standard is an apparatus that is not executing group owner negotiation and is neither a group owner nor a client. At this time, the application A 109 searches for a printer by a known discovery process in the Wi-Fi Direct standard. Then, the application A 109 wirelessly connects the mobile terminal 100 and a printer selected by the user from among printers discovered by the search, in compliance with the Wi-Fi Direct standard not via a wireless LAN router. At this time, if the application A 109 discovers only one printer by the search, the application A 109 may automatically connect with the printer wirelessly in compliance with the Wi-Fi Direct standard without making an inquiry to the user. Then, by acquiring registration information from the printer wirelessly connecting with the mobile terminal 100 in compliance with the Wi-Fi Direct standard by the wireless connection, the application A 109 registers the printer in the application A 109. Even after the registration, the wireless connection between the printer and the mobile terminal 100 that complies with the Wi-Fi Direct standard is maintained. In the present exemplary embodiment, the application A 109 does not store the registration information about a printer in the information sharing region 201 as the shared information 202 based on a fact that the printer has been registered using the fourth registration method. This is because some applications cannot execute communication in compliance with the Wi-Fi Direct standard.

A fifth registration method executable by the application A 109 will be described. The application A 109 can execute communication by NFC. If the mobile terminal 100 approaches a printer in a state in which image data is selected in the application A 109, the application A 109 acquires connection information for establishing Wi-Fi connection with the printer from the printer by NFC communication. Specifically, the connection information includes an SSID of an access point to be enabled in the printer, and a password for connecting with the access point. Subsequently, using the acquired connection information, the application A 109 establishes wireless connection (P2P connection) between the printer and the mobile terminal 100 by Wi-Fi not via a wireless LAN router. Before establishing the wireless connection, the application A 109 may issue an instruction for enabling an access point in the printer by NFC communication. Then, by acquiring registration information from the printer by the P2P connection, the application A 109 registers the printer in the application A 109. Then, the application A 109 transmits a print job for causing the printer to print the selected image data to the printer by the P2P connection. If the transmission of the print job is completed, the application A 109 disconnects the P2P connection between the printer and the mobile terminal 100. In the present exemplary embodiment, the application A 109 does not store the registration information about a printer in the information sharing region 201 as the shared information 202 based on a fact that the printer has been registered using the fifth registration method. This is because the printer cannot be easily used by an application other than the application A 109 since the P2P connection between the printer and the mobile terminal 100 is disconnected after the printer is registered using the fifth registration method. The communication executed by NFC in the fifth registration method may be executed by Classic Bluetooth or BLE in place of NFC.

As described above, in the present exemplary embodiment, if a printer is registered in the application A 109, while registration information about the printer is stored as the shared information 202 in some cases, the registration information is not stored in other cases depending on the registration method. With such a configuration, only the registration information about an appropriate printer to be used in the application cooperation can be made usable by another application as the shared information 202.

The above description has been given of patterns in which, even if a printer is registered in the application A 109, registration information about the printer is not stored as the shared information 202. However, these patterns may include a pattern in which the registration information about the printer is stored as the shared information 202. In other words, it is sufficient if the registration information about the printer is not stored in the information sharing region 201 as the shared information 202 in at least one of the above-described patterns. Thus, for example, the registration information about the printer may be stored in the information sharing region 201 as the shared information 202 based on the fact that the printer has been registered using the third registration method or the fourth registration method.

In the present exemplary embodiment, the shared information 202 is updated each time a printer is newly registered in the application A 109 in a state in which the shared information 202 is already stored in the information sharing region 201. Needless to say, the shared information 202 is not updated in the pattern in which the shared information 202 is not stored. In addition, if the same printer as the already-registered printer is newly registered, the shared information 202 needs not be updated.

By registration processing being performed on a plurality of printers, the plurality of printers may be registered in one application. In this case, the application A 109 transmits a print job to a printer selected as a selected apparatus from among the plurality of registered printers. On a screen displayed by the application A 109, the user can appropriately select or change the selected apparatus from among the plurality of registered printers. In addition, if a different printer is newly registered in a state in which a certain printer is already selected as the selected apparatus, the newly-registered printer is selected as the selected apparatus irrespective of the registration method. On the screen illustrated in FIG. 6, the icon 601 corresponding to a printer selected as the selected apparatus is displayed, and the icon 601 corresponding to a registered printer unselected as the selected apparatus is not displayed.

In the case of a configuration in which the plurality of printers can be registered in one application, registration information regarding the plurality of registered printers may be stored in the information sharing region 201 as the shared information 202. Alternatively, only registration information regarding one printer (e.g., a printer selected as the selected apparatus) among the plurality of registered printers may be stored in the information sharing region 201 as the shared information 202. For example, a case is cited where a printer B is newly registered using the second registration method in a state in which a printer A has been registered using the second registration method and registration information regarding the printer A has been stored in the information sharing region 201 as the shared information 202. In this case, both the printer A and the printer B are registered in the application A 109, but the shared information 202 stored in the information sharing region 201 is updated to registration information regarding the newly-registered printer B. Subsequently, the printer A is selected by the user as the selected apparatus. In this case, the shared information 202 stored in the information sharing region 201 is updated to the registration information regarding the printer A. In addition, for example, a case is cited where the printer B is newly registered in the pattern in which the shared information 202 is not stored in a state in which the printer A has been registered using the second registration method and the registration information regarding the printer A has been stored in the information sharing region 201 as the shared information 202. As described above, the pattern in which the shared information 202 is not stored is a pattern in which the printer B is registered using the third registration method or the fourth registration method, for example. In this case, both the printer A and the printer B are registered in the application A 109, but the shared information 202 stored in the information sharing region 201 is not updated to the registration information regarding the printer B and remains unchanged from the registration information regarding the printer A.

In the present exemplary embodiment, while registration using all of the plurality of registration methods can be performed by the application A 109, only registration using the first registration method can be performed by the application B 110 and the application C 111. In other words, the application A 109 has a performance registration function higher than those of the application B 110 and the application C 111. The application B 110 and the application C 111 may be enabled to perform the registration using a registration method other than the first registration method.

When an application (e.g., the application B 110) other than the application A 109 that has stored the shared information 202 is activated, the shared information 202 stored as described above is acquired by the application. Then, by the shared information 202 being used by the application, information can be shared between the application A 109 and the application other than the application A 109. In addition, it becomes possible to register, in the application B 110 or the application C 111, a printer that cannot be registered using the registration method executable by the application B 110 or the application C 111.

FIG. 3 is a flowchart illustrating processing executed by the mobile terminal 100 using the application A 109. The processing illustrated in this flowchart is implemented by the CPU 101 loading a program corresponding to the application A 109 that is stored in the storage device 106 to the memory 104, and executing the program, for example. In addition, the processing illustrated in this flowchart is started in a state in which a screen for executing a function of the application A 109 is displayed on the display unit 105 by the application A 109.

First, in step S301, the CPU 101 executes printer registration processing in the application A 109. As described above, registration methods to be used in the registration processing executed in this step include the first to fifth registration methods.

Subsequently, in step S302, the CPU 101 determines whether to store printer registration information acquired in step S301 in the information sharing region 201 as the shared information 202. Specifically, first, the CPU 101 identifies the registration method used in the registration processing executed in step S301. Then, if any of the third registration method, the fourth registration method, and the fifth registration method is identified, the CPU 101 determines that the printer registration information is not to be stored in the information sharing region 201 as the shared information 202. If the first registration method is identified and if the registered printer is a printer to which the mobile terminal 100 connects in compliance with the Wi-Fi Direct standard, the CPU 101 determines that the printer registration information is not to be stored in the information sharing region 201 as the shared information 202. On the other hand, if the second registration method is identified, the CPU 101 determines that the printer registration information is to be stored in the information sharing region 201 as the shared information 202. If the first registration method is identified and the registered printer is a printer connecting to a wireless LAN router by Wi-Fi, the CPU 101 determines that the printer registration information is to be stored in the information sharing region 201 as the shared information 202. If the CPU 101 determines that the printer registration information is to be stored in the information sharing region 201 as the shared information 202 (YES in step S302), the processing proceeds to step S303. If the CPU 101 determines that the printer registration information is not to be stored in the information sharing region 201 as the shared information 202 (NO in step S302), the processing proceeds to step S304 without the printer registration information being stored in the information sharing region 201 as the shared information 202.

In step S303, the CPU 101 stores the printer registration information acquired in step S301 in the information sharing region 201 as the shared information 202.

In step S304, the CPU 101 receives a cooperative activation operation of the application B 110. Specifically, for example, the CPU 101 receives an operation on the icon 609 from the user.

The processing in step S304 needs not be always executed successively after the processing in step S303 or S302. For example, after it is determined in step S302 that the shared information 202 is to be stored, the processing in step S303 may be executed after the icon 602 is operated and a print job is transmitted using the application A 109. Alternatively, for example, the processing in step S303 may be executed after the activation of the application A 109 is once ended and the application A 109 is subsequently activated again.

In step S305, the CPU 101 determines whether the application B 110 is installed on the mobile terminal 100. If the CPU 101 determines that the application B 110 is installed on the mobile terminal 100 (YES in step S305), the processing proceeds to step S306. In step S306, the CPU 101 issues an instruction for activating the application B 110 by a known method that uses a uniform resource locator (URL) scheme. The application B 110 is thereby cooperatively activated. Subsequently, the CPU 101 executes, using the application B 110, processing illustrated in FIG. 4, which will be described below. On the other hand, if the CPU 101 determines that the application B 110 is not installed on the mobile terminal 100 (NO in step S305), the processing proceeds to step S307. In step S307, the CPU 101 issues an instruction for activating the store application 108 by a known method that uses the URL scheme, for example. At this time, the CPU 101 issues the instruction by adding, to the URL scheme, the application identification information 203 for the store application 108 to identify the application B 110. A screen for downloading the application B 110 is thereby displayed upon the activation of the store application 108. By receiving an operation for downloading the application B 110 from the user in this state, the CPU 101 can download and install the application B 110. After the application B 110 is installed, a region for activating the application B 110 is displayed in the store application 108. Then, by the region for activating the application B 110 being operated by the user, the application B 110 is activated. If the application B 110 is activated in this manner, the CPU 101 executes, using the application B 110, the processing illustrated in FIG. 4, which will be described below.

With the above-described configuration, it is possible to appropriately control whether to store the printer registration information as the shared information depending on the printer registration method. In other words, it is possible to appropriately control whether to enable information acquired by the application A 109 to be acquired or used also by another application (whether to execute the application cooperation), depending on the acquisition method of information held by the application A 109.

The issue of the present disclosure will now be described. As described above, the application B 110 and the application C 111 can acquire information acquired by the application A 109 as the shared information 202. However, needless to say, if the application A 109 is not installed on the mobile terminal 100, the application B 110 and the application C 111 cannot acquire the shared information 202 because the shared information 202 is not stored in the information sharing region 201. In this case, there is such an issue that the application B 110 and the application C 111 cannot register an apparatus existing in an environment in which the apparatus can only be registered using a registration method inexecutable by the application B 110 and the application C 111. There is another issue that, for example, if the application B 110 and the application C 111 are applications that can register an apparatus only by acquisition of the shared information 202, the application B 110 and the application C 111 cannot register the apparatus. In other words, if the user uses the application B 110 or the application C 111, the application A 109 is desirably installed on the mobile terminal 100.

In view of the foregoing, in the present exemplary embodiment, description will be given of a configuration for issuing a notification by the application B 110 or the application C 111 if the application A 109, which is an application that stores the shared information 202, is not installed on the mobile terminal 100.

Figure 4:
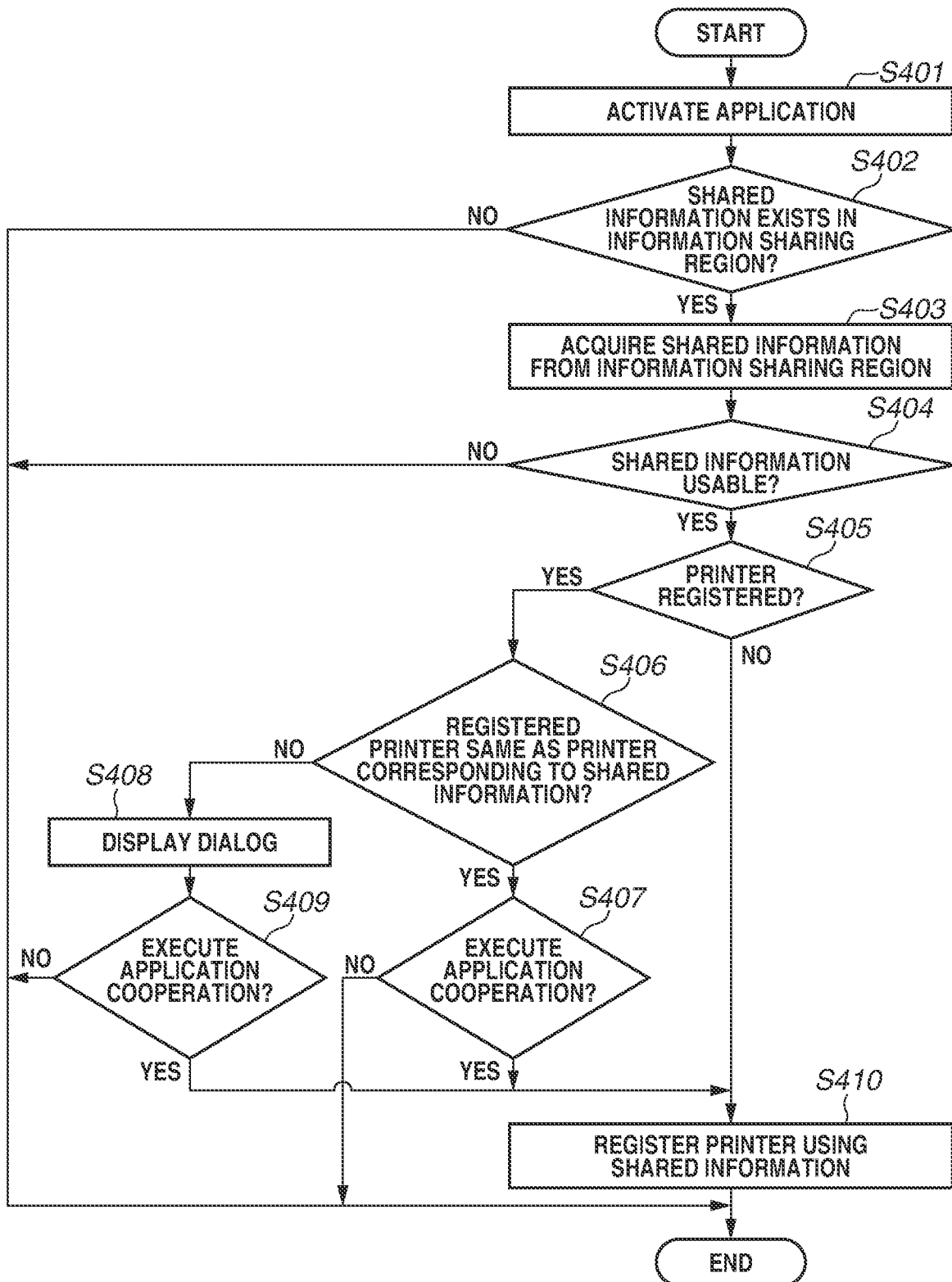
FIG. 4 is a flowchart illustrating processing executed by the mobile terminal using the application B.

FIG. 4 is a flowchart illustrating processing executed by the mobile terminal 100 using the application B 110. The processing illustrated in this flowchart is implemented by the CPU 101 loading a program corresponding to the application B 110 that is stored in the storage device 106 to the memory 104, and executing the program, for example.

First, in step S401, the CPU 101 activates the application B 110. The processing in step S401 is executed being triggered by reception of a cooperative activation operation of the application B 110 via the application A 109, reception of an activation instruction of the application B 110 via the store application 108, or reception of an activation instruction of the application B 110 via the home screen, for example.

In step S402, the CPU 101 determines whether the shared information 202 exists in the information sharing region 201. If the CPU 101 determines that the shared information 202 exists in the information sharing region 201 (YES in step S402), the processing proceeds to step S403. In step S403, the CPU 101 acquires the shared information 202. In the present exemplary embodiment, when the CPU 101 acquires the shared information 202 using the application B 110, the CPU 101 does not delete the shared information 202 from the information sharing region 201. On the other hand, if the CPU 101 determines that the shared information 202 does not exist in the information sharing region 201 (NO in step S402), the CPU 101 ends the processing without executing processing of registering a printer registered in the application A 109 in the application B 110 (without executing the application cooperation). Examples of a situation in which the shared information 202 is not stored in the information sharing region 201 include a situation in which the information sharing region 201 is an external server and the mobile terminal 100 cannot access the external server using the application A 109 due to a communication error or an authentication error. The examples of the situation further include a situation in which the printer registration processing is not executed in the application A 109 yet.

In step S404, the CPU 101 executes the availability determination. If the CPU 101 determines that the acquired shared information 202 is information usable by the application B 110 (YES in step S404), the processing proceeds to step S405. On the other hand, if the CPU 101 determines that the acquired shared information 202 is not information usable by the application B 110 (NO in step S404), the CPU 101 ends the processing without executing processing of registering a printer registered in the application A 109 in the application B 110 (without executing the application cooperation).

In step S405, the CPU 101 determines whether a printer has already been registered in the application B 110 (whether an apparatus with which communication is to be performed using the application B 110 has been set). If the CPU 101 determines that the printer has not been registered in the application B 110 (NO in step S405), the processing proceeds to step S410. On the other hand, if the CPU 101 determines that the printer has already been registered in the application B 110 (YES in step S405), the processing proceeds to step S406.

In step S406, the CPU 101 determines whether the printer registered in the application B 110 is the same printer as a printer corresponding to the shared information 202. The determination can be rephrased as processing of determining whether the shared information 202 and registration information about the printer registered in the application B 110 are the same. If the CPU 101 determines that the registered printer is the same printer (YES in step S406), the processing proceeds to step S407. If the CPU 101 determines that the registered printer is not the same printer (NO in step S406), the processing proceeds to step S408. In some cases, a plurality of printers is registered in the application B 110. In such cases, if the CPU 101 determines that the printer corresponding to the shared information 202 is the same as any of the plurality of printers, the processing proceeds to step S407. If the printer corresponding to the shared information 202 is different from all of the plurality of printers, the processing proceeds to step S408.

In step S407, the CPU 101 determines whether to execute the application cooperation. In the determination, for example, the CPU 101 compares information regarding an updated date and time that is included in the newly-acquired shared information 202 and information regarding an updated date and time that has been obtained when the shared information 202 has been previously used for the application cooperation. Then, if the former date and time is later than the latter date and time, the CPU 101 determines to execute the application cooperation. If the former date and time is earlier than the latter date and time, the CPU 101 determines not to execute the application cooperation. Alternatively, in the determination, for example, the CPU 101 compares the information regarding an updated date and time that is included in the newly-acquired shared information 202 and information regarding the latest registered date and time of a printer in the application B 110. Then, if the former date and time is later than the latter date and time, the CPU 101 determines to execute the application cooperation. If the former date and time is earlier than the latter date and time, the CPU 101 determines not to execute the application cooperation. If the CPU 101 determines to execute the application cooperation (YES in step S407), the processing proceeds to step S410. If the CPU 101 determines not to execute the application cooperation (NO in step S407), the CPU 101 ends the processing without executing processing of registering a printer registered in the application A 109 in the application B 110 (without executing the application cooperation).

Alternatively, if it is determined that the registered printer is the same printer (YES in step S406), the processing may always proceed to step S410 without executing the processing in step S407.

In step S408, the CPU 101 displays a dialog for prompting the user to select whether to register a printer registered in the application A 109 in the application B 110 (whether to execute the application cooperation).

In step S409, the CPU 101 determines whether the user has selected to execute the application cooperation on the dialog displayed in step S408. If the CPU 101 determines that the user has selected to execute the application cooperation (YES in step S409), the processing proceeds to step S410. If the CPU 101 determines that the user has selected not to execute the application cooperation (NO in step S409), the CPU 101 ends the processing without executing processing of registering the printer registered in the application A 109 in the application B 110 (without executing the application cooperation).

If the CPU 101 determines that the registered printer is not the same printer (NO in step S406), the CPU 101 may always end the processing without executing the processing of registering the printer registered in the application A 109 in the application B 110 (without executing the application cooperation), without executing the processing in steps S408 and S409.

In step S410, the CPU 101 registers the printer registered in the application A 109 in the application B 110 using the shared information 202. In the present exemplary embodiment, even if the printer registered in the application A 109 is registered in the application B 110, the shared information 202 is not deleted from the information sharing region 201.

The processing executed by the application B 110 has been described with reference to FIG. 4. Similar processing can be executed by the application C 111.

With the above-described configuration, both the application B 110 and the application C 111 can acquire the shared information 202 irrespective of an activation timing and execute the application cooperation with the application A 109.

After the application B 110 is activated and the processing illustrated in FIG. 4 has been executed, a home screen of the application B 110 is displayed. If the application cooperation is executed since the shared information 202 has been stored in the information sharing region 201 at the time of activation of the application B 110, information regarding a printer registered in the application B 110 by the application cooperation is displayed on the home screen. On the other hand, if the shared information 202 is not stored in the information sharing region 201 at the time of activation of the application B 110, and the application cooperation is not executed, a region for prompting registration of a printer is displayed on the home screen. The home screen also includes a region for executing the registration of a printer. If the region is operated, the application B 110 starts the processing using the first registration method. Specifically, first, the application B 110 searches for a printer supporting the application B 110 on a Wi-Fi network to which the mobile terminal 100 belongs. Then, the application B 110 displays a printer discovered by the search. At this time, if the printer supporting the application B 110 does not exist on the Wi-Fi network to which the mobile terminal 100 belongs, the application B 110 cannot display information regarding any printer. As a result, if the application cooperation cannot be executed and a printer has not been discovered using the first registration method, a printer cannot be registered by the application B 110.

Even if the printer supporting the application B 110 does not exist, there may be a printer discoverable by a registration method that is inexecutable by the application B 110 but executable by the application A 109. Thus, if the application cooperation cannot be executed and a printer has not been discovered using the first registration method, it is desirable that a printer is registered by the application A 109, and then the printer is registered in the application B 110 by the application cooperation. In other words, it is desirable to prompt the user to install the application A 109, prompt the user to register a printer by the application cooperation, or notify the user of a registration method inexecutable by the application B 110.

In view of the above-described issue, in the present exemplary embodiment, the application B 110 executes appropriate notification processing.

Figure 7:
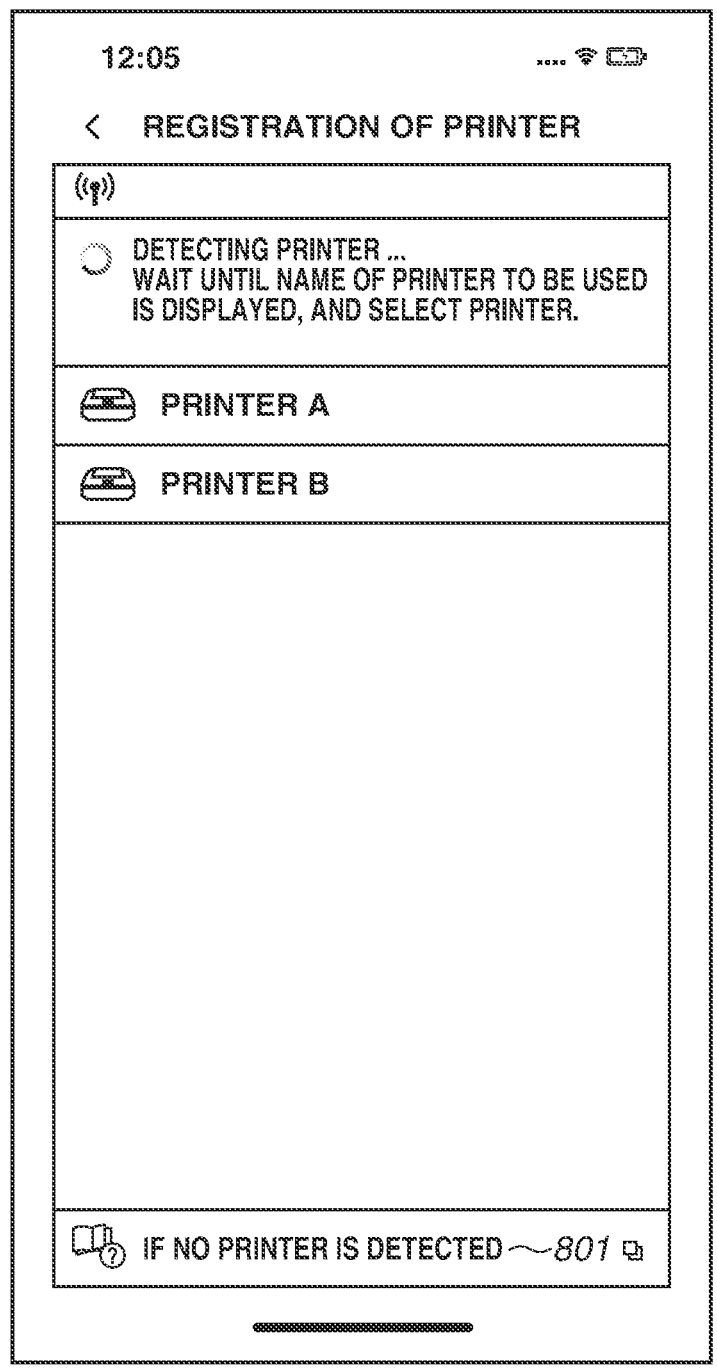
FIG. 7 illustrates an example of a screen including a notification region.

Specifically, the application B 110 displays a notification region on a screen (list screen) displaying a printer discovered by the search using the first registration method. The notification region is a region for prompting the user to install the application A 109, prompting the user to register a printer by the application cooperation, or notifying the user of a registration method inexecutable by the application B 110. FIG. 7 illustrates a screen 800 including a notification region 801. FIG. 7 illustrates the screen 800 in a state in which a printer has been discovered by the search using the first registration method. However, even if no printer has been discovered by the search using the first registration method, the notification region 801 is still displayed. In the present exemplary embodiment, the notification region 801 functions as a link. If the notification region 801 is operated, the application B 110 activates a Web browser and displays an instruction manual. FIG. 8 illustrates a screen 900 on which the instruction manual is displayed. The instruction manual includes a message for prompting the user to install the application A 109, and a message for prompting the user to register a printer by the application cooperation. Specifically, the message for prompting the user to register a printer by the application cooperation is a message for prompting the user to activate the application B 110 after a printer is registered by the application A 109, for example. The instruction manual also includes a message for notifying the user of a registration method inexecutable by the application B 110, and describing details of the registration method.

The instruction manual to be displayed if the notification region 801 is operated may be displayed on the application B 110 instead of the Web browser. In addition, the application B 110 may directly display the instruction manual on the list screen, not via the link like the notification region 801. In addition, the instruction manual may include a region for displaying a screen for installing the application A 109 by activating a store application.

With such a configuration, it is possible to enhance usability of an application that cannot execute a certain registration method among a plurality of registration methods.

In the above-described exemplary embodiment, the notification region is displayed on the list screen, but the present disclosure is not limited to this configuration. For example, the notification region may be displayed on another screen such as a home screen of the application B 110.

In the above-described exemplary embodiment, the notification region is displayed irrespective of whether the shared information 202 is stored in the information sharing region 201, but the present disclosure is not limited to this configuration. If the shared information 202 is stored in the information sharing region 201 when the application B 110 is activated or when the region for executing the registration of a printer is operated, the notification region needs not be displayed. In addition, the notification region may be displayed based on a fact that the shared information 202 is not stored in the information sharing region 201 when the application B 110 is activated or when a region for executing the registration of a printer is operated. In other words, whether to display the notification region may be controlled based on the determination result in step S402, for example.

In addition, cases in which the shared information 202 is not stored in the information sharing region 201 include a case in which the application A 109 is not installed, and a case in which the application A 109 is installed but registration processing is not executed by the application A 109. Thus, if it is determined in step S402 that the shared information 202 is not stored in the information sharing region 201, it may be further determined whether the application A 109 is installed. Then, if it is determined that the application A 109 is installed, notification processing for prompting the user to execute the registration processing using the application A 109 may be executed. Alternatively, if it is determined that the application A 109 is not installed, notification processing for prompting the user to install the application A 109 may be executed.

In addition, it may be determined whether the application A 109 is installed instead of the determination in step S402. Then, if it is determined that the application A 109 is installed, the notification region is not displayed, and if it is determined that the application A 109 is not installed, the notification region is displayed.

In addition, the mobile terminal 100 may be in an environment in which the application A 109 cannot be installed. The environment in which the application A 109 cannot be installed is an environment in which internet communication cannot be performed, for example. Thus, before notification processing for prompting the user to install the application A 109 is executed, whether the mobile terminal 100 is in the environment in which the application A 109 cannot be installed may be determined. Then, if it is determined that the mobile terminal 100 is in the environment in which the application A 109 cannot be installed, processing of notifying the user of a registration method executable by the application B 110 may be executed. If it is determined that the mobile terminal 100 is in the environment in which the application A 109 can be installed, notification processing for prompting the user to install the application A 109 may be executed.

In the above-described exemplary embodiment, the description has been given of the configuration in which download of the application B 110 is executed by the store application 108, but the present disclosure is not limited to this configuration. For example, the CPU 101 may download the application B 110 from a web page. In this case, in the above-described configuration, processing of activating the store application 108 becomes processing of activating a program for displaying the web page. By using information regarding a target application when the program for displaying the web page is activated, the web page for downloading the target application can be directly displayed. After the CPU 101 downloads the application B 110 using the store application 108, the CPU 101 may install the application B 110 using an installer. Alternatively, the CPU 101 may download and install the application B 110 from a personal computer.

In the above-described exemplary embodiment, the description has been given of the configuration in which, irrespective of whether the application B 110 is independently activated or cooperatively activated, the CPU 101 refers to the information sharing region 201 and acquires the shared information 202. However, the present disclosure is not limited to this configuration. For example, if the application B 110 is cooperatively activated, the application cooperation may be executed using information added to a URL scheme as the shared information 202. Thus, in this case, if a cooperative activation operation of the application B 110 is performed, the CPU 101 adds the information to the URL scheme.

In the above-described exemplary embodiment, a printing application is used as an example of the application A 109, the application B 110, and the application C 111, and registration information is used as an example of the shared information 202, but the present disclosure is not limited to this configuration. In other words, the application A 109 and the application B 110 are to be applications that can share information with each other, and the functions of the applications are not limited. For example, an apparatus to be registered in each application may be an apparatus other than a printer. In addition, the content of the shared information 202 is not limited. For example, each application may be an application for remotely controlling a camera, and a camera may be registered in each application. Alternatively, for example, each application may be an application for controlling a smart speaker, and a smart speaker may be registered in each application. Yet alternatively, for example, the application A 109 may be a camera application, and the application B 110 may be a photo album creation application. In this case, for example, the shared information 202 may be data on images that can be arranged in a photo album. In this case, specific processing in the application cooperation includes processing of converting the shared information 202 (image data) into a thumbnail and displaying the thumbnail, and processing of storing the shared information 202 in a region that can be referred to by the application B 110.

In the above-described exemplary embodiment, cooperation between the application A 109 and the application B 110, and between the application A 109 and the application C 111 has been described, but the shared information 202 handled by the application A 109 can also be used in another application aside from the application B 110 and the application C 111. More specifically, by executing, in the other application, processing similar to the processing executed when the application B 110 or the application C 111 is activated, the shared information 202 handled by the application A 109 can be used in a plurality of applications.

In the above-described exemplary embodiment, the description has been given of the configuration of controlling whether to store the registration information in the information sharing region 201 depending on the registration method, but the present disclosure is not limited to this configuration. For example, while the registration information is stored in the information sharing region 201 irrespective of the registration method, it may be controlled whether to acquire the registration information using the application B 110 or the application C 111 depending on the registration method. In this configuration, for example, the application A 109 stores, in the information sharing region 201, information regarding the registration method, a communication path, and a communication method that have been used for acquiring the registration information together with the registration information. The application B 110 or the application C 111 acquires, prior to acquiring the registration information, the information regarding the registration method, the communication path, and the communication method that have been used for acquiring the registration information, and determines whether to acquire the registration information based on a case identified using the acquired information. If it is identified that the registration information has been acquired using the registration method (e.g., the second registration method) used in the case of storing the registration information in the information sharing region 201 in the above-described exemplary embodiment, the application B 110 or the application C 111 acquires the registration information and executes the application cooperation. On the other hand, if it is identified that the registration information has been acquired using the registration method (e.g., the third registration method) used in the case of not storing the registration information in the information sharing region 201 in the above-described exemplary embodiment, the application B 110 or the application C 111 does not acquire the registration information and does not execute the application cooperation. With such a configuration, the application cooperation can be appropriately executed.

The above-described exemplary embodiment is also implemented by executing the following processing. More specifically, the processing is processing of supplying software (a program) for implementing the functions of the above-described exemplary embodiment to a system or an apparatus via a network or various storage media, and a computer (a CPU, a micro processing unit (MPU), etc.) of the system or the apparatus reading the program and executing the program. The program may be executed by one computer, or may be executed by a plurality of computers in cooperation with each other. All of the above-described processes need not be implemented by software, and part or all of the processes may be implemented by hardware such as an application specific integrated circuit (ASIC). In addition, all of the processes need not be performed by one CPU, and the processes may be performed by a plurality of CPUs in cooperation with each other as necessary.

In an exemplary embodiment of the present disclosure, it is possible to enhance convenience of programs that can execute program cooperation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2020-103340, filed Jun. 15, 2020, which is hereby incorporated by reference herein in its entirety.

What is claimed is:

1. A control method of an information processing apparatus including a predetermined application program that cannot acquire predetermined information regarding a communication apparatus using a predetermined method, the control method comprising:
    acquiring, in a case where the predetermined information is stored by a different application program that is different from the predetermined application program and can acquire the predetermined information using the predetermined method, the predetermined information stored by the different application program, using the predetermined application program;
    executing, in a case where the predetermined information stored by the different application program is acquired, processing that is based on the predetermined information stored by the different application program, using the predetermined application program; and
    displaying a predetermined region for prompting a user to install the different application program, using the predetermined application program.

2. The control method according to claim 1, wherein the processing that is based on the predetermined information stored by the different application program is processing of registering, in the predetermined application program, the communication apparatus corresponding to the predetermined information as an apparatus that performs communication using the predetermined application program.

3. The control method according to claim 1, wherein the predetermined application program can acquire the predetermined information using a different method different from the predetermined method.

4. The control method according to claim 3,
    wherein the different method includes search processing of searching for one or a plurality of communication apparatuses on a network to which the information processing apparatus belongs, and
    wherein the predetermined information is acquired from one or a plurality of communication apparatuses of the one or the plurality of communication apparatuses discovered by the search processing.

5. The control method according to claim 4, further comprising displaying a screen including the one or the plurality of communication apparatuses discovered by the search processing,
    wherein the predetermined region is displayed on the screen.

6. The control method according to claim 3, wherein the different method includes a method of acquiring, from the communication apparatus connecting to an external access point to which the information processing apparatus connects, the predetermined information via the external access point.

7. The control method according to claim 1, wherein the predetermined method includes a method of acquiring the predetermined information via an external access point after information regarding the external access point is transmitted to the communication apparatus via connection between the information processing apparatus and the communication apparatus, and connection between the external access point and the communication apparatus is established based on the transmitted information regarding the external access point.

8. The control method according to claim 1,
    wherein the predetermined method includes a method of acquiring the predetermined information via first connection after information regarding an internal access point of the communication apparatus is transmitted to the information processing apparatus via connection between the information processing apparatus and the communication apparatus, and the first connection between the internal access point and the information processing apparatus is established based on the transmitted information regarding the internal access point, and
    wherein the first connection is maintained after the predetermined information is acquired.

9. The control method according to claim 1,
    wherein the different application program can acquire the predetermined information using a specific method different from the predetermined method and the different method,
    wherein the predetermined application program can acquire the predetermined information stored in a predetermined region, and
    wherein, in a case where the predetermined information is acquired using the predetermined method, the different application program stores the predetermined information in the predetermined region, and in a case where the predetermined information is acquired using the specific method, the different application program does not store the predetermined information in the predetermined region.

10. The control method according to claim 9, wherein the specific method includes a method of acquiring the predetermined information from the communication apparatus to which the information processing apparatus connects via Wi-Fi Direct®.

11. The control method according to claim 9,
wherein the specific method includes a method of acquiring, via second connection, the predetermined information after information regarding an internal access point of the communication apparatus is transmitted to the communication apparatus via connection between the information processing apparatus and the communication apparatus, and the second connection is established between the internal access point and the information processing apparatus based on the transmitted information regarding the internal access point,
wherein the second connection is disconnected after the predetermined information is acquired, and
wherein the second connection is re-established in a case where an instruction to communicate with the communication apparatus is issued in the predetermined application program.

12. The control method according to claim 11, wherein communication of the information regarding the internal access point is communication by Classic Bluetooth or Bluetooth Low Energy.

13. The control method according to claim 9,
wherein the specific method includes a method of acquiring, via third connection between an internal access point and an information processing apparatus, the predetermined information after information regarding the internal access point of the communication apparatus is transmitted to the communication apparatus via connection between the information processing apparatus and the communication apparatus and the third connection is established based on the transmitted information regarding the internal access point, and
wherein communication of different information different from the predetermined information is further executed via the third connection, and the third connection is disconnected after the predetermined information is acquired and the communication of the different information is executed.

14. The control method according to claim 13, wherein communication of the information regarding the internal access point is communication by Near Field Communication or Bluetooth®.

15. The control method according to claim 1, wherein control is performed in such a manner that the predetermined region is displayed in a case where the different application program is not installed on the information processing apparatus, and the predetermined region is not displayed in a case where the different application program is installed on the information processing apparatus.

16. The control method according to claim 1,
wherein the predetermined application program can acquire the predetermined information stored in the predetermined region, and
wherein control is performed in such a manner that the predetermined region is displayed in a case where the predetermined information is not stored in the predetermined region and the predetermined region is not displayed in a case where the predetermined information is stored in the predetermined region.

17. The control method according to claim 1, wherein the predetermined region is at least one of a link for displaying a screen including a message corresponding to the predetermined region, a region in which a store application displays a screen for installing the different application program, or a region for describing the predetermined method.

18. The control method according to claim 1, wherein the predetermined application program and the different application program are programs that generate a print job for causing the communication apparatus corresponding to the predetermined information to execute printing.

19. The control method according to claim 1, wherein the predetermined information includes at least one of a media access control (MAC) address, a Bonjour name, an internet protocol (IP) address, a model name of the communication apparatus, capacity information about the communication apparatus, or information regarding a date and time on which the predetermined information is acquired.

20. A control method of an information processing apparatus including a predetermined application program that cannot acquire predetermined information regarding a communication apparatus using a predetermined method, the control method comprising:
acquiring, in a case where the predetermined information is stored by a different application program that is different from the predetermined application program, and can acquire the predetermined information using the predetermined method, the predetermined information stored by the different application program, using the predetermined application program;
executing, in a case where the predetermined information stored by the different application program is acquired, processing that is based on the predetermined information stored by the different application program, using the predetermined application program; and
displaying a predetermined region for prompting a user to activate the predetermined application program, using the predetermined application program after the communication apparatus is registered using the different application program,
wherein the processing that is based on the predetermined information stored by the different application program is processing of registering, in the predetermined application program, the communication apparatus corresponding to the predetermined information as an apparatus that performs communication using the predetermined application program, and
wherein, in a case where the communication apparatus corresponding to the predetermined information is registered in the different application program as an apparatus that performs communication using the different application program, the predetermined information is stored.

* * * * *